G. S. WOOD.
REMOVABLE TRUCK NOSE.
APPLICATION FILED JUNE 13, 1918.
1,345,470.
Patented July 6, 1920.
2 SHEETS—SHEET 1.
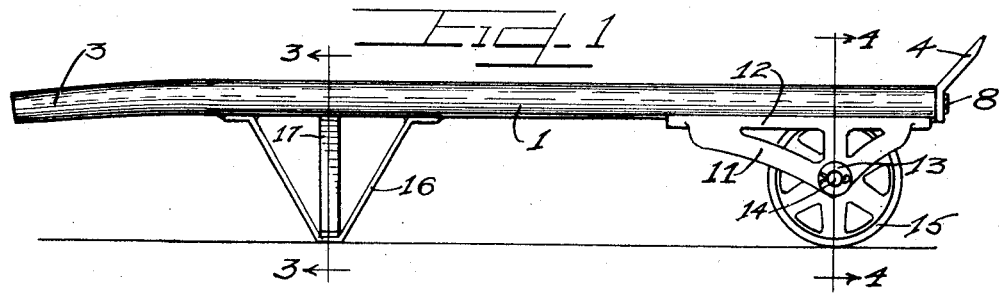
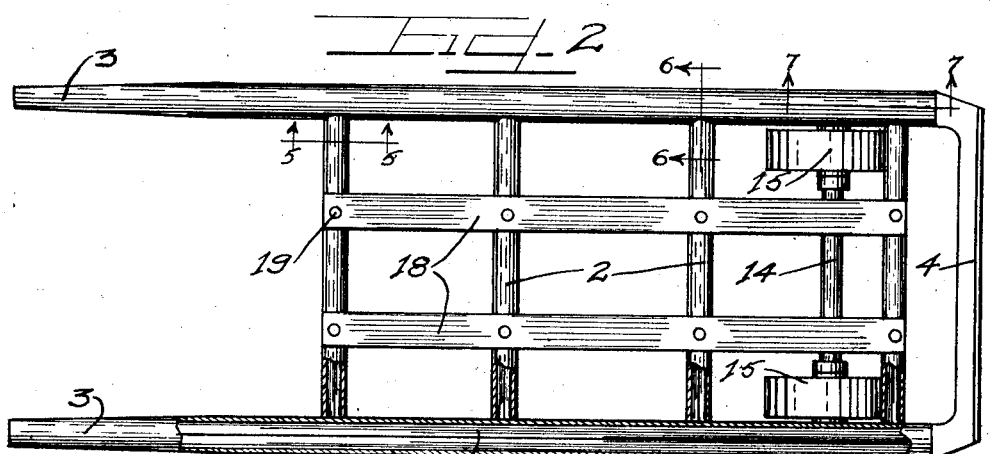
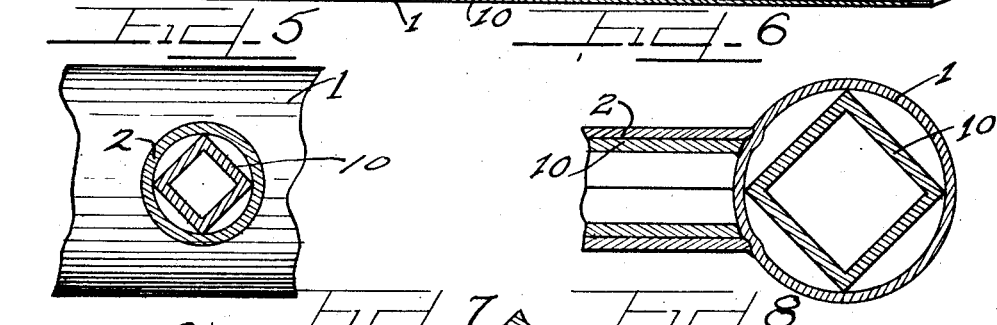
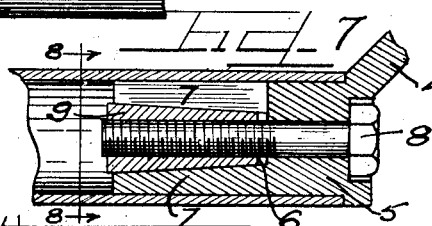
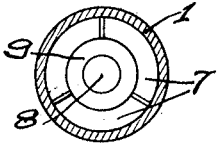

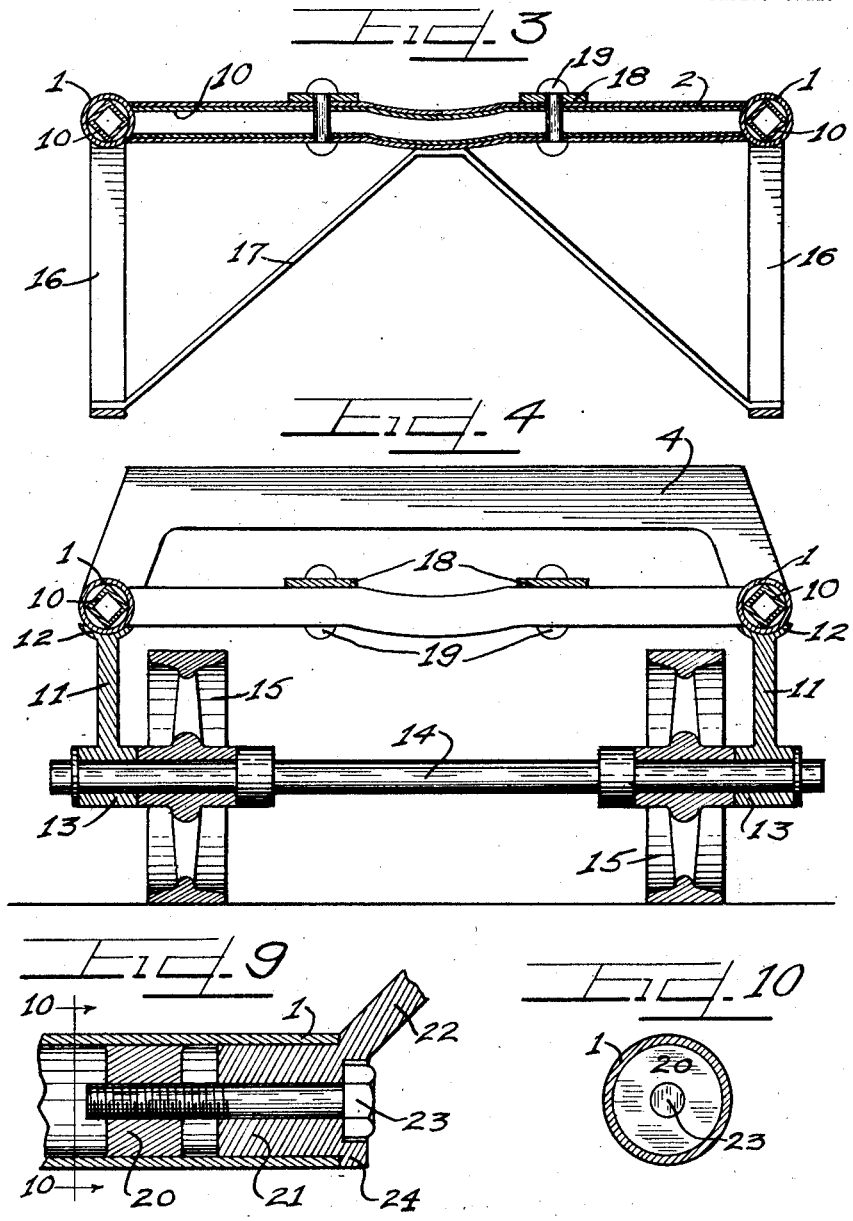

UNITED STATES PATENT OFFICE.

GUILFORD S. WOOD, OF CHICAGO, ILLINOIS.

REMOVABLE TRUCK-NOSE.

1,345,470.  Specification of Letters Patent.  Patented July 6, 1920.

Application filed June 13, 1918. Serial No. 239,709.

*To all whom it may concern:*

Be it known that I, GUILFORD S. WOOD, a citizen of the United States, and a resident of the city of Chicago, in the county of Cook and State of Illinois, have invented certain new and useful Improvements in Removable Truck-Noses; and I do hereby declare that the following is a full, clear, and exact description of the same, reference being had to the accompanying drawings, and to the numerals of reference marked thereon, which form a part of this specification.

This invention pertains to an improved form of a removable nose adaptable for use on a hand truck and so constructed as to permit the same to be readily removed and replaced by a different style nose if desired.

It is an object of this invention to provide an improved form of a truck nose adapted to be removably mounted on a truck frame.

It is also an object of the invention to construct a truck nose to permit the same to be removably secured in the sills of a truck frame.

Another object of the invention is the construction of a truck nose adapted to be removably secured in the open ends of tubular side sills of a truck frame.

It is a further object of the invention to provide a truck wherein an internally reinforced truck frame has a truck nose removably engaged in certain of the truck frame members.

It is furthermore an object of this invention to construct a truck nose provided with bolts adapted to be projected longitudinally into tubular sills of a truck frame to removably secure the truck nose in position.

It is an important object of the invention to provide a truck nose provided with wedge means for removably securing the truck nose into the open ends of tubular truck frame sills.

Other and further important objects of this invention will be apparent from the disclosures in the specification and drawings.

The invention (in a preferred form) is illustrated in the drawing and hereinafter more fully described.

On the drawings:—

Figure 1 is a side elevation of a truck equipped with a removable nose embodying the principles of this invention.

Fig. 2 is a top plan view thereof, with parts broken away.

Fig. 3 is an enlarged section taken on line 3—3, of Fig. 1, with parts in elevation.

Fig. 4 is an enlarged detail section taken on line 4—4, of Fig. 1, showing parts in elevation.

Fig. 5 is an enlarged fragmentary detail section on line 5—5, of Fig. 2.

Fig. 6 is an enlarged fragmentary detail section taken on line 6—6, of Fig. 2.

Fig. 7 is an enlarged fragmentary detail section taken on line 7—7, of Fig. 2.

Fig. 8 is a section on line 8—8, of Fig. 7.

Fig. 9 is a detail section similar to that shown in Fig. 7, of a modified form of the device.

Fig. 10 is a section taken on line 10—10, of Fig. 9.

As shown on the drawings:—

The hand truck embraces a frame comprising longitudinal tubes or tubular sills 1, which are parallel and rigidly held spaced from one another by means of transverse tubes or tubular cross pieces 2, welded at their ends to said tubular sills 1, to afford a substantially unitary frame construction. The rear ends of the sills 1, are swayed or bent downwardly to form handles 3. The front ends of the sills are open and have frictionally and removably engaged therein a nose consisting of a cross-rail or nose-piece 4, each end of which has integrally formed thereon a passaged shank 5, the end of which is provided with a tapered opening or passage 6, and is longitudinally slotted to form a plurality of curved segment shaped prongs or friction wedge members 7. A screw bolt 8, projects through each of the passaged shanks 5, and threads into a tapered wedge nut 9, which when drawn into the tapered opening 6, forces the wedge prongs outwardly into a tight frictional or wedging engagement with the inner surface of the outer ends of the frame sills 1, as clearly shown in Fig. 7, thus removably holding the truck nose in position.

As shown in Figs. 3 and 4, the central portion of each of the transverse tubes 2, are slightly dished. A squared tube or angular reinforcing member 10, is axially disposed within each of the sills 1, and the transverse tubes 2, to reinforce the same and resist upward, downward and sidewise bending of the truck frame members.

Wheel axle brackets 11, form a part of the truck, and have integrally formed or rigidly secured thereon relatively long concave troughs or seats 12, which receive the front ends of the sills 1, seated therein. The concave troughs 12, are welded to the sills 1, thus obviating the use of bolts and drilling of said sills. Integrally formed on the lower portions of the brackets 11, are bearing members 13, for supporting an axle 14, on which are mounted running wheels 15.

Welded to each of the frame sills 1, to the inside of the handles 3, is a leg, supporting rest or stirrup 16. The legs 16, are braced and connected to one another and to one of the transverse tubes 2, by means of a transverse brace 17, the ends of which are welded to said legs, while the central portion is welded to the rear transverse tube 2.

Flat metal straps or bars 18, are disposed upon the transverse tubes 2, parallel to the frame sills 1, and are rigidly secured in position by means of bolts or rivets 19, which project through the straps and through the transverse tubes 2, and the reinforcing members 10, thereof. The straps 18, serve to support smaller articles upon the truck and prevent the same from falling through the frame, as well as serving as a tie between the transverse tubes to increase the rigidity of the truck frame.

From the construction of the truck as described it will be seen that the truck frame comprises few parts, and inasmuch as the sills, the transverse tubes, the axle brackets, the legs and the brace bracket are all welded together, the truck frame is substantially a one piece or a unitary construction. When a load is positioned upon the truck or a force is exerted or applied to the frame sills and transverse tubes, said sills and tubes are held or braced against bending by the squared or angular reinforcing tubes 10, the edges of which contact the inner surfaces of said sills and tubes. This construction permits the use of frame members of great strength and relatively light weight. As shown in Fig. 7, the truck nose is adapted to be readily removed from the truck frame by removal of the bolts 8, thus permitting the use of different types of truck noses.

With the form of nose attaching mechanism as shown in Fig. 7, by threading the bolt outwardly the wedge nut 9, is permitted to be moved away from the shank 5, thus allowing the expanded flexible wedge members 7, to move inwardly toward one another into normal position whereby the shank may be drawn out of the sill to permit the nose to be replaced by a nose of a different type or shape.

Figs. 9 and 10, disclose a modified form of the device wherein each of the side sills 1, has welded or otherwise rigidly secured therein near the front end thereof a circular block 20, provided with a threaded longitudinal or axial passage. Projecting into the open front ends of the sills 1, are the shanks 21, which are integrally formed on the ends of a nose 22. Said shanks are longitudinally passaged to permit bolts 23, to project therethrough and thread into the blocks 20, thereby drawing the shanks 21, into the sills until the flanged portions 24, of the nose abut against the front ends of said sills.

I am aware that numerous details of construction may be varied through a wide range without departing from the principles of this invention, and I therefore do not purpose limiting the patent granted otherwise than necessitated by the prior art.

I claim as my invention:—

1. The combination with a tubular truck, of a nose member having the ends thereof removably wedged in certain of the tubular members forming the truck.

2. The combination with the tubular sills of a truck frame, of a nose, shanks integrally formed thereon and expanding means adapted to be wedged into said shanks to removably hold said nose in position.

3. The combination with tubular truck frame sills, of a nose, shanks integrally formed thereon projecting into said sills, and means projecting longitudinally through said shanks for removably holding said nose in position.

4. The combination with tubular truck frame sills, of a nose, passaged shanks integrally formed thereon projecting into said sills, screw bolts projecting through said shanks, and means adapted to be engaged by said screw bolts for removably holding said nose secured in position.

5. The combination with tubular truck frame sills, of a nose, passaged shanks thereon engaged in said sills, means in said passaged shanks, and members for drawing said means farther into said shanks for removably securing said nose to said sills.

6. The combination with tubular truck frame sills, of a nose, shanks thereon, resilient members integrally formed on said shanks, and projecting into said sills, and means for moving said resilient members away from one another to tightly engage against the inner surfaces of said sills to hold said nose in position.

7. The combination with tubular truck frame sills, of a nose, passaged shanks thereon projecting into said sills, resilient means integrally formed on said shanks, wedges associated with said shanks, and means for drawing said wedges into said shanks for forcing said resilient means apart and into locking engagement with said sills to removably hold said nose in position.

8. A truck frame nose comprising a cross-rail, shanks integrally formed on the ends thereof, and adjustable means co-axially disposed in said shanks to permit mounting of the nose.

9. The combination with a truck nose, of expansible wedge members integrally formed on each end thereof.

10. The combination with a truck nose, of expansible shank members integrally formed on each end thereof, and means for expanding said members.

In testimony whereof I have hereunto subscribed my name in the presence of two subscribing witnesses.

GUILFORD S. WOOD.

Witnesses:
LAWRENCE REIBSTEIN,
FRANK A. BREMER, Jr.